US012061458B2

(12) United States Patent
Gadre et al.

(10) Patent No.: US 12,061,458 B2
(45) Date of Patent: Aug. 13, 2024

(54) SYSTEMS AND METHODS FOR ADAPTIVE TROUBLESHOOTING OF SEMICONDUCTOR MANUFACTURING EQUIPMENT

(71) Applicant: APPLIED MATERIALS, INC., Santa Clara, CA (US)

(72) Inventors: Milind Jayram Gadre, San Jose, CA (US); Prashanth Kumar, Union City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 398 days.

(21) Appl. No.: 17/459,433

(22) Filed: Aug. 27, 2021

(65) Prior Publication Data
US 2023/0061513 A1 Mar. 2, 2023

(51) Int. Cl.
G05B 19/406 (2006.01)
G06F 16/901 (2019.01)
G06N 20/00 (2019.01)

(52) U.S. Cl.
CPC ....... *G05B 19/406* (2013.01); *G06F 16/9024* (2019.01); *G06N 20/00* (2019.01); *G05B 2219/33322* (2013.01)

(58) Field of Classification Search
CPC ........ G06N 20/00; G06N 20/20; G06N 3/084; G06N 5/01; G06N 5/022; G05B 19/406; G05B 2219/33322; G05B 23/024; G05B 13/0265; G05B 13/048; G05B 19/418; G05B 19/4184; G05B 19/41875; G05B 2219/31455; G05B 2219/32193; G05B 2219/32194; G05B 2219/45031; G05B 2219/45234; G05B 23/02; G06F 16/9024

USPC .......................................................... 700/110
See application file for complete search history.

(56) References Cited

U.S. PATENT DOCUMENTS

| | | | |
|---|---|---|---|
| 2005/0084615 | A1 | 4/2005 | Weidman |
| 2014/0257752 | A1* | 9/2014 | Mast .................. G05B 23/0227 702/183 |
| 2014/0368340 | A1* | 12/2014 | Jerzak ................ G05B 23/0221 340/540 |
| 2018/0082826 | A1* | 3/2018 | Guha ................ H01J 37/32082 |
| 2018/0217566 | A1 | 8/2018 | Moyne |
| 2018/0284737 | A1* | 10/2018 | Cella ................ G05B 19/41875 |
| 2020/0111689 | A1* | 4/2020 | Banna .................. G05B 13/048 |

(Continued)

OTHER PUBLICATIONS

PCT Notification of Transmittal of The International Search Report and The Written Opinion of The International Searching Authority for PCT Application No. PCT/2022/041749, mailed Dec. 20, 2022, 13 pages.

*Primary Examiner* — Chun Cao
(74) *Attorney, Agent, or Firm* — Lowenstein Sandler LLP

(57) ABSTRACT

A system includes a processing device, operatively coupled to the memory device, to perform operations comprising obtaining a plurality of sensor values associated with a deposition process performed, according to a recipe, in a process chamber to deposit film on a surface of a substrate; generating a manufacturing data graph based on the plurality of sensor values; receiving, via a user interface, a selection of a data point on the manufacturing graph; receiving failure data associated with the data point; and storing, in a data structure, the failure data to be accessible via the user interface presenting the manufacturing data graph.

20 Claims, 8 Drawing Sheets

(56) References Cited

U.S. PATENT DOCUMENTS

| | | |
|---|---|---|
| 2020/0133254 A1 | 4/2020 | Cella |
| 2020/0166909 A1 | 5/2020 | Noone |
| 2020/0233740 A1 | 7/2020 | Jones |
| 2022/0284342 A1* | 9/2022 | Cantwell ............... G06F 18/214 |
| 2022/0367297 A1* | 11/2022 | Cheng ................. H01J 37/3244 |

* cited by examiner

SYSTEMS AND METHODS FOR ADAPTIVE TROUBLESHOOTING OF SEMICONDUCTOR MANUFACTURING EQUIPMENT

TECHNICAL FIELD

Embodiments of the present disclosure relates to electrical components, and, more particularly, to performing adaptive troubleshooting of semiconductor manufacturing equipment.

BACKGROUND

Products may be produced by performing one or more manufacturing processes using manufacturing equipment. For example, semiconductor manufacturing equipment may be used to produce semiconductor devices (e.g., substrates, wafers, etc.) via semiconductor manufacturing processes. The manufacturing equipment can deposit multiple layers of film on the surface of the substrate and can perform an etch process to form the intricate pattern in the deposited film. For example, the manufacturing equipment may perform a chemical vapor deposition (CVD) process to deposit alternative layers on the substrate. Sensors may be used to determine manufacturing parameters of the manufacturing equipment during the manufacturing processes and metrology equipment may be used to determine property data of the products that were produced by the manufacturing equipment, such as the overall thickness of the layers on the substrate. Generally, the manufacturing equipment can monitor individual sensors to detect a problem during the deposition process. However, monitoring individual sensors does not provide an indication of the overall health of different sub-systems of the manufacturing equipment, which can allow for deteriorating conditions to go undetected, leading to significant downtime and repair time. Therefore, a system capable of generating metrics indicative of the overall system health each sub-system during the manufacturing process is desirable.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a system includes a memory; and a processing device, operatively coupled to the memory device, to perform operations comprising, obtaining a plurality of sensor values associated with a deposition process performed according to a recipe, in a process chamber to deposit film on a surface of a substrate. The processing device further performs operations comprising generating a manufacturing graph based on the plurality of sensor values. The processing device further performs operations comprising receiving, via a user interface, a selection of a data point on the manufacturing data graph. The processing device further performs operations comprising receiving failure data associated with the data point and storing, in a data structure, the failure data to be accessible via the user interface presenting the manufacturing data graph.

In another aspect of the disclosure, a method includes obtaining a plurality of sensor values associated with a deposition process performed according to a recipe, in a process chamber to deposit film on a surface of a substrate. The method further includes generating a manufacturing graph based on the plurality of sensor values. The method further includes receiving, via a user interface, a selection of a data point on the manufacturing data graph. The method further includes receiving failure data associated with the data point and storing, in a data structure, the failure data to be accessible via the user interface presenting the manufacturing data graph.

In another aspect of the disclosure, a method includes obtaining, by a processor, a plurality of sensor values associated with a deposition process performed, according to a recipe, in a process chamber to deposit film on a surface of a substrate. The method further includes applying a machine-learning model to the plurality of sensor values, the machine-learning model trained based on historical sensor data of a sub-system of the process chamber and task data associated with the recipe for depositing the film. The method further includes generating an output of the machine-learning model, wherein the output is indicative of a type of failure of the sub-system. The method further includes determining the type of failure of the sub-system, and generating a corrective action based on the type of failure.

BRIEF DESCRIPTION OF THE DRAWINGS

The present disclosure is illustrated by way of example, and not by way of limitation in the figures of the accompanying drawings.

FIGS. 6A-6B schematically illustrate example metadata and failure data maintained by the representation server, according to aspects of the present disclosure.

DETAILED DESCRIPTION

Figure 1:
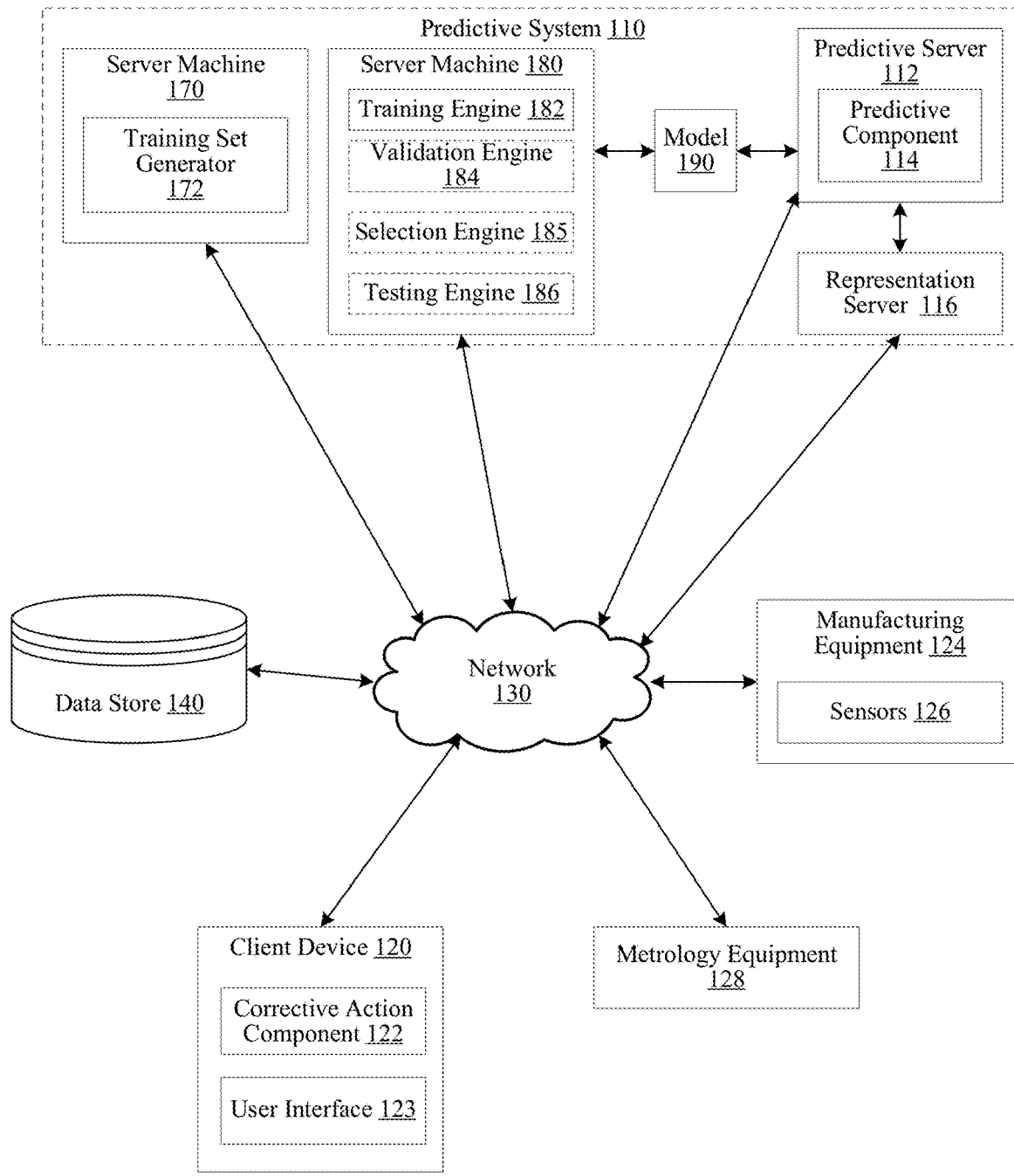
FIG. 1 is a block diagram illustrating an exemplary system architecture, according to certain embodiments.

Described herein are technologies directed to systems and methods performing adaptive troubleshooting of semiconductor manufacturing equipment. A film can be deposited on a surface of a substrate during a deposition process (e.g., a deposition (CVD) process, an atomic layer deposition (ALD) process, and so forth) performed at a process chamber of a manufacturing system. For example, in a CVD process, the substrate is exposed to one or more precursors, which react on the substrate surface to produce the desired deposit. The film can include one or more layers of materials that are formed during the deposition process, and each layer can include a particular thickness gradient (e.g., changes in the thickness along a layer of the deposited film). For example, a first layer can be formed directly on the surface of the substrate (referred to as a proximal layer or proximal end of the film) and have a first thickness. After the first layer is formed on the surface of the substrate, a second layer having a second thickness can be formed on the first layer. This process continues until the deposition process is completed and a final layer is formed for the film (referred to as the distal layer or distal end of the film). The film can include alternating layers of different materials. For example, the film can include alternating layers of oxide and nitride layers (oxide-nitride-oxide-nitride stack or ONON stack), alternating oxide and polysilicon layers (oxide-polysilicon-oxide-polysilicon stack or OPOP stack), and so forth. The film can be subjected to, for example, an etch process to form a pattern on the surface of the substrate, a chemical-mechanical polishing (CMP) process to smooth the surface of the film, or any other process necessary to manufacture the finished substrate.

A process chamber can have multiple sub-systems operating during each substrate manufacturing process (e.g., the deposition process, the etch process, the polishing process, etc.). A subsystem can be characterized as a set of sensors related with an operational parameter of the process chamber. An operational parameter can be a temperature, a flow rate, a pressure, and so forth. In an example, a pressure subsystem can be characterized by one or more sensors measuring the gas flow, the chamber pressure, the control valve angle, the foreline (vacuum line between pumps) pressure, the pump speed, and so forth. Accordingly, the process chamber can include a pressure subsystem, a flow subsystem, a temperature subsystem, and so forth. Each sub-system can experience deterioration and deviate from optimal performance conditions, and/or failure in one or more components. For example, the pressure subsystem can generate reduced pressure due to one or more of pump faults or failure, control valve faults or failures, etc.

Existing systems use limit checking of single sensor values to detect faults or failures in the process chamber. For example, existing systems can monitor whether a sensor value falls below or exceeds a predetermined threshold value (e.g., a temperature sensor exceeding a predetermined temperature threshold value), upon which an operator may manually inspect and investigate. However, a sensor value falling below or exceeding the predetermined threshold value may not indicate a root problem of a subsystem. Further, a subsystem where multiple sensors are experiencing failure may be indicative of an unrelated issue (e.g., low pump output due to a poor cable connection). This can cause the operator to unnecessarily replace an operational component while trying to determine the cause of the failure.

Aspects and implementations of the present disclosure address these and other shortcoming of existing technology by generating and updating manufacturing data graphs for training a machine-learning model capable of providing diagnostics. In particular, the system of the present disclosure obtains manufacturing data associated with a prior deposition process performed in a process chamber to deposit a film on a surface of a substrate (and/or associated with other processes such as an etching process, a polishing process, etc.). The manufacturing data can include sensor data (e.g., sensor values associated with a sub-system of the process chamber), metrology data, task data (data associated with a process recipe for depositing the film, etching the film, etc.), test data, and so forth. The system can then generate and display, on a user interface, a manufacturing data graph.

The manufacturing data graph can be a bar graph, a line graph, a scatter plot graph, or any other type of graph capable of visually displaying manufacturing-related data. The manufacturing data graph can display data related to a process chamber, a process recipe, a step of the process recipe, a sensor, etc. For example, the manufacturing data graph can display sensor data from one or more sensors associated with different steps of the manufacturing process over time (e.g., a trace view). More specifically and as an example, the manufacturing data graph can display pressure values over time for each step of a deposition process (e.g., each layer of film deposited on the substrate).

For each step, the system can associate or correlate related data (such as metadata, process recipe data, limit data, etc.). For example, for a step of a process recipe, the system can associate metadata such as a process chamber identifier, a process recipe identifier, a subsystem type (e.g., pressure, flow, etc.), an operator name, a date and/or time, etc. Via a user interface, an operator can select a particular data point from the manufacturing data graph and view the related data.

The user interface can further provide an operator with a ticketing tool. The ticketing tool can enable the operator to open a ticket (case file) for a suspected fault or failure associated with a step. For example, an operator can notice a spike in pressure during a particular step, select said step (or a data point(s) of said step) from the manufacturing data graph, and open a ticket for the step. The user interface can display a ticket page (e.g., an application page, a browser page, etc.) enabling the operator to view metadata associated with the step or data point, and to enter (log) failure data relating to the step. In an example, the system can prompt the operator to enter a description of the fault or failure, a possible root cause of the fault or failure, a recommended corrective action to correct the fault or failure, etc. For example, the operator can select a data point, on the manufacturing data graph that is indicative of a pressure spike and, on the ticket page, enter that the fault is an abnormal pressure spike, the possible root cause is a gas burst issue, and the recommend corrective action is a calibration. Each ticket can be stored by the system for future access or reference. For example, an operator may notice a pressure spike in another step, and, via the user interface, filter or sort tickets based on pressure spike. The operator may then open a similar ticket to determine the possible root cause and recommended corrective action using the logged failure data.

In some embodiments, the system can further provide a machine-learning model trained to generate predictive data indicative of a suspected fault or failure, and recommend corrective actions based on the suspected fault or failure. In an illustrative example, the system can map sensor data to task data to generate a training set. The system can then train a machine-learning model, using the training set, to provide data indicative of expected sensor values of a sub-system. The system can then refine the machine-learning model with the data from the manufacturing data graph to enable the machine-learning model to identify sensor data (or other manufacturing data) indicative of a suspected fault or failure. The machine-learning model can then indicate a recommended corrective action. For example, the system can apply the machine-learning model to current sensor values to determine a suggested corrective action in response to detecting a failure or fault. In some embodiments, the output from the machine-learning model can include a value(s)

indicative of a fault pattern associated with the process chamber sub-system. The system can then compare the fault pattern to a library of known fault patterns to determine the type of failure experienced by the sub-system, the root cause of the failure, the recommended corrective action to correct the fault, and so forth. In some embodiments, the system can maintain the library by extracting failure data from the manufacturing data graphs and associating the failure data with the fault patterns. The system can extract the failure data using, for example, natural language processing. In some embodiments, the system performs and/or recommends, based on the fault pattern, a corrective action to adjust one or more parameters of a deposition process recipe (e.g., a temperature setting for the process chamber, a pressure setting for the process chamber, a flow rate setting for a precursor for a material included in the film deposited on the substrate surface, etc.), replace one or more components of the process chamber sub-system (e.g., sensor, pump, equipment, tool, etc.), perform a cleaning, and so forth.

Aspects of the present disclosure result in technological advantages of significant reduction in time required to detect and diagnose faults and failures in a process chamber sub-system(s) during manufacturing of substrates, as well as improvements in energy consumption, and so forth. Aspects of the present disclosure can also result in generating diagnostic data and performing corrective actions to avoid inconsistent and abnormal products, and unscheduled downtime.

FIG. 1 depicts an illustrative computer system architecture 100, according to aspects of the present disclosure. In some embodiments, computer system architecture 100 can be included as part of a manufacturing system for processing substrates, such as manufacturing system 300 of FIG. 3. Computer system architecture 100 includes a client device 120, manufacturing equipment 124, metrology equipment 128, a predictive server 112 (e.g., to generate predictive data, to provide model adaptation, to use a knowledge base, etc.), a representation server 116 (e.g., to generate and provide manufacturing data graphs, to provide a ticketing tool, etc.) and a data store 140. The predictive server 112 and representative server 116 can be part of a predictive system 110. The predictive system 110 can further include server machines 170 and 180. The manufacturing equipment 124 can include sensors 126 configured to capture data for a substrate being processed at the manufacturing system. In some embodiments, the manufacturing equipment 124 and sensors 126 can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system).

Manufacturing equipment 124 can produce products, such as electronic devices, following a recipe or performing runs over a period of time. Manufacturing equipment 124 can include a process chamber, such as process chamber 400 described with respect to FIG. 4. Manufacturing equipment 124 can perform a process for a substrate (e.g., a wafer, etc.) at the process chamber. Examples of substrate processes include a deposition process to deposit one or more layers of film on a surface of the substrate, an etch process to form a pattern on the surface of the substrate, etc. Manufacturing equipment 124 can perform each process according to a process recipe. A process recipe defines a particular set of operations to be performed for the substrate during the process and can include one or more settings associated with each operation. For example, a deposition process recipe can include a temperature setting for the process chamber, a pressure setting for the process chamber, a flow rate setting for a precursor for a material included in the film deposited on the substrate surface, etc.

In some embodiments, manufacturing equipment 124 includes sensors 126 that are configured to generate data associated with a substrate processed at manufacturing system 100. For example, a process chamber can include one or more sensors configured to generate spectral or non-spectral data associated with the substrate before, during, and/or after a process (e.g., a deposition process) is performed for the substrate. In some embodiments, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include temperature sensors, pressure sensors, flow rate sensors, voltage sensors, etc. Further details regarding manufacturing equipment 124 are provided with respect to FIG. 3 and FIG. 4.

In some embodiments, sensors 126 provide sensor data (e.g., sensor values, features, trace data) associated with manufacturing equipment 124 (e.g., associated with producing, by manufacturing equipment 124, corresponding products, such as wafers). The manufacturing equipment 124 may produce products following a recipe or performing runs over a period of time. Sensor data received over a period of time (e.g., corresponding to at least part of a recipe or run) may be referred to as trace data (e.g., historical trace data, current trace data, etc.) received from different sensors 126 over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

Metrology equipment 128 can provide metrology data associated with substrates processed by manufacturing equipment 124. The metrology data can include a value of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, TEM techniques, and so forth.

In some embodiments, metrology equipment 128 can be included as part of the manufacturing equipment 124. For example, metrology equipment 128 can be included inside of or coupled to a process chamber and configured to generate metrology data for a substrate before, during, and/or after a process (e.g., a deposition process, an etch process, etc.) while the substrate remains in the process chamber. In such instances, metrology equipment 128 can be referred to as in-situ metrology equipment. In another example, metrology equipment 128 can be coupled to another station of manufacturing equipment 124. For example, metrology equipment can be coupled to a transfer chamber, such as transfer chamber 310 of FIG. 3, a load lock, such as load lock 320, or a factory interface, such as factory interface 306. In such instances, metrology equipment 128 can be referred to as integrated metrology equipment. In other or similar embodiments, metrology equipment 128 is not coupled to a station of manufacturing equipment 124. In such instances, metrology equipment 128 can be referred to as inline metrology equipment or external metrology equipment. In some embodiments, integrated metrology equipment and/or inline metrology equipment are configured to generate metrology data for a substrate before and/or after a process.

The client device 120 may include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, the metrology data can be received from the client device 120. Client device 120 can display a graphical user interface (GUI), where the GUI enables the user to provide, as input, metrology measurement values for substrates processed at the manufacturing system. The client device 120 can include a corrective action component 122. Corrective action component 122 can receive user input (e.g., via a Graphical User Interface (GUI) 123 displayed on the client device 120) of an indication associated with manufacturing equipment 124. In some embodiments, the corrective action component 122 transmits the indication to the predictive system 110, receives output (e.g., predictive data) from the predictive system 110, determines a corrective action based on the output, and causes the corrective action to be implemented. In some embodiments, the corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). The data store 140 can store data associated with processing a substrate at manufacturing equipment 124. For example, data store 140 can store data collected by sensors 126 at manufacturing equipment 124 before, during, or after a substrate process (referred to as process data). Process data can refer to historical process data (e.g., process data generated for a prior substrate processed at the manufacturing system) and/or current process data (e.g., process data generated for a current substrate processed at the manufacturing system). Data store can also store spectral data or non-spectral data associated with a portion of a substrate processed at manufacturing equipment 124. Spectral data can include historical spectral data and/or current spectral data.

The data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further identify sensors that are associated with a particular sub-system of a process chamber.

The data store 140 can also store task data. Task data can include one or more sets of operations to be performed for the substrate during a deposition process and can include one or more settings associated with each operation. For example, task data for a deposition process can include a temperature setting for a process chamber, a pressure setting for a process chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

The data store 140 can also store alarm data. Alarm data can include one or more threshold settings, criterion, or triggers indicative of a failure, fault, and/or an operation exceeding the limits of its setting. For example, alarm data can indicate a setting (e.g., temperature setting, pressure setting, flow rate setting, etc.) exceeding or falling below a predetermined threshold value, a poor cable connection, a non-functioning component, etc.

In some embodiments, the data store 140 can store function data. Function data can include installation data, connection data, operational data, hardware data, software data, or any other data related to the mechanical and/or electrical performance of the manufacturing equipment.

In some embodiments, the data store 140 can store troubleshooting data. Trouble shooting data can include any type of corrective data indicative of a possible action to correct a fault and/or failure. Corrective data can further include maintenance data indicative of suggesting maintenance actions to be performed on the manufacturing equipment 124. The troubleshooting data can be generated during manufacturing or calibration of the manufacturing system 124. In some embodiments, the troubleshooting data can include one or more manufacturing data graphs. The manufacturing data graphs can be used to provide diagnostic data and/or used for training a machine-learning model capable of providing diagnostics.

The manufacturing data graph can be a bar graph, a line graph, a scatter plot graph, or any other type of graph capable of visually displaying manufacturing-related data. The manufacturing data graph can display data related to one or more process chamber, one or more process recipes, one or more steps of the process recipe, one or more sensors, etc. For example, the manufacturing data graph can display sensor data from one or more sensors associated with different steps of the manufacturing process over time (e.g., a trace view). Each data point or measurement unit on the manufacturing data graph can be associated with metadata. The metadata can be viewed in the GUI 123 and can include a process chamber identifier, a process recipe identifier, a subsystem type (e.g., pressure sub-system), an operator name, a date and/or time, a description of the issue or fault, a possible root cause of the fault, a recommended corrective action to correct the fault, a resolution status (e.g., open, ongoing, not started, closed, etc.), comments, etc. The metadata can be generated automatically, manually, or a combination thereof. The manufacturing data graph(s) can be updated using current manufacturing data (e.g., data from manufacturing substrates), operator input, library data, data generated by model 190 and/or the predictive server 112, etc. The manufacturing graph data will be explained in greater detail below in FIG. 5.

In some embodiments, the data store 140 can include manufacturing test data and quality data. The manufacturing test data can be indicative of how the manufacturing equipment 124 performed during the manufacturing process, efficiency data, etc. The quality data can include data associated with the quality of the substrates. The quality data can be based on or include, for example, metrology data.

In some embodiments, the data store 140 can include a fault library associating failure data with fault patterns. The fault library can be generated by the predictive system 110 (e.g., the representation server 116) by extracting failure data from the manufacturing data graphs and associating the failure data with the fault patterns. The system can extract the failure data using, for example, natural language processing. The fault library can be used by model 190 to suggest a corrective action to adjust one or more parameters of a deposition process recipe (e.g., a temperature setting for the process chamber, a pressure setting for the process chamber, a flow rate setting for a precursor for a material included in the film deposited on the substrate surface, etc.), replace one or more components of the process chamber sub-system (e.g., sensor, pump, equipment, tool, etc.), perform a cleaning, and so forth.

In some embodiments, data store 140 can be configured to store data that is not accessible to a user of the manufacturing system. For example, process data, spectral data, contextual data, manufacturing test data, quality data, etc. obtained for a substrate being processed at the manufacturing system is not accessible to a user (e.g., an operator) of the manufacturing system. In some embodiments, all data stored at data store 140 can be inaccessible by the user of the manufacturing system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores. For example, the manufacturing test data and quality data can be stored in a first data store that is inaccessible to the user and the process data, spectral data, and contextual data can be stored in a second databased that is accessible to the user.

In some embodiments, predictive system 110 includes representation server 116. Representation server 116 can generate (and display on GUI 123), a manufacturing data graph. The manufacturing data graph can be a bar graph, a line graph, a scatter plot graph, or any other type of graph capable of visually displaying manufacturing-related data, such as data from data store 140. The manufacturing data graph can display data related to manufacturing equipment 124, a process recipe, a step of the process recipe, a sensor(s) 126, etc. In some embodiments, the manufacturing data graph can display sensor data, trace data, metrology data, historical data, spectral data, corrective data, limit data, etc. The representation server can associate or correlate related data (such as metadata, process recipe data, limit data (e.g., acceptable thresholds of pressure, flow, etc.), and so forth, to a data point of the manufacturing data graph, to a step of the manufacturing data graph, etc. For example, for each step of a process recipe, the representation server 116 can associate metadata such as a process chamber identifier, a process recipe identifier, a subsystem type (e.g., pressure, flow, etc.), an operator name, a date and/or time, etc. Via a user interface, an operator can select a particular data point from the manufacturing data graph and view the related data. The GUI 123 can further provide an operator with a ticketing tool. The ticketing tool can enable the operator to open a ticket (case file) for a suspected fault or failure. Further details regarding the manufacturing data graph are provided with respect to FIGS. 5A and 5B.

In some embodiments, predictive system 110 includes predictive server 112, server machine 170 and server machine 180. The predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Server machine 170 includes a training set generator 172 that is capable of generating training data sets (e.g., a set of data inputs and a set of target outputs) to train, validate, and/or test a machine-learning model 190. Machine-learning model 190 can be any algorithmic model capable of learning from data. Some operations of data set generator 172 is described in detail below with respect to FIG. 2. In some embodiments, the data set generator 172 can partition the training data into a training set, a validating set, and a testing set. In some embodiments, the predictive system 110 generates multiple sets of training data.

Server machine 180 can include a training engine 182, a validation engine 184, a selection engine 185, and/or a testing engine 186. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training one or more machine-learning models 190. Machine-learning model 190 can refer to the model artifact that is created by the training engine 182 using the training data (also referred to herein as a training set) that includes training inputs and corresponding target outputs (correct answers for respective training inputs). The training engine 182 can find patterns in the training data that map the training input to the target output (the answer to be predicted), and provide the machine-learning model 190 that captures these patterns. The machine-learning model 190 can use one or more of a statistical modelling, support vector machine (SVM), Radial Basis Function (RBF), clustering, supervised machine-learning, semi-supervised machine-learning, unsupervised machine-learning, k-nearest neighbor algorithm (k-NN), linear regression, random forest, neural network (e.g., artificial neural network), etc.

The validation engine 184 can be capable of validating machine-learning model 190 using a corresponding set of features of a validation set from training set generator 172. The validation engine 184 can determine an accuracy of machine-learning model 190 based on the corresponding sets of features of the validation set. The validation engine 184 can discard a trained machine-learning model 190 that has an accuracy that does not meet a threshold accuracy. In some embodiments, the selection engine 185 can be capable of selecting a trained machine-learning model 190 that has an accuracy that meets a threshold accuracy. In some embodiments, the selection engine 185 can be capable of selecting the trained machine-learning model 190 that has the highest accuracy of the trained machine-learning models 190.

The testing engine 186 can be capable of testing a trained machine-learning model 190 using a corresponding set of features of a testing set from data set generator 172. For example, a first trained machine-learning model 190 that was trained using a first set of features of the training set can be tested using the first set of features of the testing set. The testing engine 186 can determine a trained machine-learning model 190 that has the highest accuracy of all of the trained machine-learning models based on the testing sets.

As described in detail below, predictive server 112 includes a predictive component 114 that is capable of providing data indicative of expected sensor values of a sub-system each sub-system of a process chamber, and running trained machine-learning model 190 on the current sensor data input to obtain one or more outputs. The predictive server 112 can further provide data indicative of the suspected faults or failures, and providing diagnostics, such as recommending corrective actions based on the suspected fault or failure. This will be explained in further detail below.

The client device 120, manufacturing equipment 124, sensors 126, metrology equipment 128, predictive server 112, representation server 116, data store 140, server machine 170, and server machine 180 can be coupled to each other via a network 130. In some embodiments, network 130 is a public network that provides client device 120 with access to predictive server 112, data store 140, and other publically available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, can be provided by a fewer number of machines. For example, in some embodiments, server machines 170 and 180 can be integrated into a single machine, while in some other or similar embodiments, server machines 170 and 180, as well as predictive server 112, can be integrated into a single machine.

In general, functions described in one implementation as being performed by server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

Figure 2:
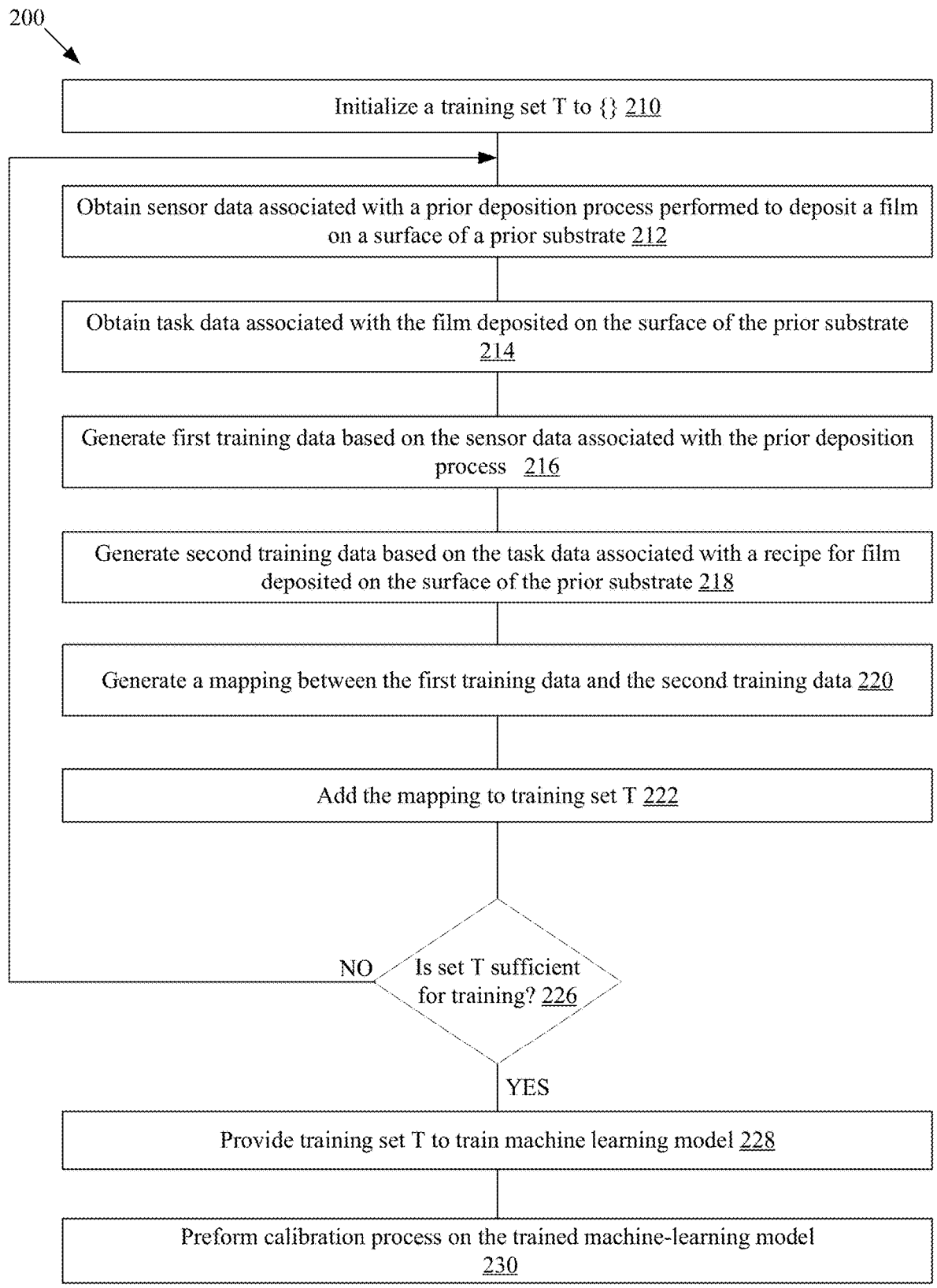
FIG. 2 is a flow diagram of a method for training a machine-learning model, according to certain embodiments.

FIG. 2 is a flow chart of a method 200 for training a machine-learning model, according to aspects of the present disclosure. Method 200 is performed by processing logic that can include hardware (circuitry, dedicated logic, etc.), software (such as is run on a general purpose computer system or a dedicated machine), firmware, or some combination thereof. In one implementation, method 200 can be performed by a computer system, such as computer system architecture 100 of FIG. 1. In other or similar implementations, one or more operations of method 200 can be performed by one or more other machines not depicted in the figures. In some aspects, one or more operations of method 200 can be performed by server machine 170, server machine 180, and/or predictive server 112.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, processing logic initializes a training set T to an empty set (e.g., { }).

At block 212, processing logic obtains sensor data (e.g., sensor values, features, trace data) associated with a prior deposition process performed to deposit one or more layers of film on a surface of a prior substrate. The sensor data can be further associated with a sub-system of a process chamber. A sub-system can be characterized as a set of sensors related with an operational parameter of the process chamber. An operational parameter can be a temperature, a flow rate, a pressure, and so forth. For example, a pressure sub-system can be characterized by one or more sensors measuring the gas flow, the chamber pressure, the control valve angle, the foreline (vacuum line between pumps) pressure, the pump speed, and so forth. Each process chamber can include multiple different sub-systems, such as a pressure sub-system, a flow sub-system, a temperature sub-system, and so forth.

In some embodiments, the sensor data associated with the deposition process is historical data associated with one or more prior deposition settings for a prior deposition process previously performed for a prior substrate at a manufacturing system. For example, the historical data can be historical contextual data associated with the prior deposition process stored at data store 140. In some embodiments, the one or more prior deposition settings can include at least one of a prior temperature setting for the prior deposition process, a prior pressure setting for the prior deposition setting, a prior flow rate setting for a precursor for one or more material of the prior film deposited on the surface of the prior substrate, or any other setting associated with the deposition process.

A flow rate setting can refer to a flow rate setting for the precursor at an initial instance of the prior deposition process (referred to as an initial flow rate setting), a flow rate setting for the precursor at a final instance of the prior deposition process (referred to as a final flow rate setting), or a ramping rate for the flow rate of the precursor during the deposition process. In one example, the precursor for the prior film can include a boron-containing precursor or a silicon-containing precursor. In some embodiments, the sensor data can also be associated with a prior etching process performed on the prior substrate, or any other process performed in the process chamber.

At block 214, processing logic obtains task data associated with a recipe for film deposited on the surface of the prior substrate. For example, the task data can a required temperature setting, a pressure setting, a flow rate setting for a precursor for a material of a film deposited on a substrate, etc. In some embodiments, the task data can include limits required by the recipe. Task data can include historical task data for a prior film deposited on a surface of a prior substrate. In some embodiments, the historical task data for the prior film can correspond to a historical task value associated with a recipe for the prior film. Processing logic can obtain the task data from data store 140, in accordance with previously described embodiments.

At block 216, processing logic generates first training data based on the obtained sensor data associated with the prior deposition process performed for the prior substrate. At block 218, processing logic generates second training data based on the task data associated with the recipe for film deposited on the surface of the prior substrate.

At block 220, processing logic generates a mapping between the first training data and the second training data. The mapping refers to the first training data that includes or is based on data for the prior deposition process performed for the prior substrate and the second training data that includes or is based on task data associated with the recipe for film deposited on the surface of the prior substrate, where the first training data is associated with (or mapped to) the second training data. At block 224, processing logic adds the mapping to the training set T.

At block 226, processing logic determines whether the training set, T, includes a sufficient amount of training data to train a machine-learning model. It should be noted that in some implementations, the sufficiency of training set T can be determined based simply on the number of mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set does not include a sufficient amount of training data to train the machine-learning model, method 200 returns to block 212. Responsive to determining the training set T includes a sufficient amount of training data to train the machine-learning model, method 200 continues to block 228.

At block 228, processing logic provides the training set T to train the machine-learning model. In one implementation, the training set T is provided to training engine 182 of server machine 180 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T. It is noted that training the machine-learning model using sensor data and task data is discussed by way of exemplary example, and that the machine-learning model can be trained using any type of manufacturing data or data associated with manufacturing data graphs.

In some embodiments, the processing logic can perform outlier detection methods to remove anomalies from the training set T prior to training the machine-learning model. Outlier detection methods can include techniques that identify values that differs significantly from the majority the training data. These values can be generated from errors, noise, etc.

At block 230, processing logic perform a calibration process on the trained machine-learning model to enable the machine learning model to detect abnormal behavior of the process chamber sub-system(s). In some embodiments, the processing logic can compare the expected behavior of the process chamber sub-system to current behavior of the process chamber sub-system based on the differences in values between the expected behavior and the current behavior. For example, the processing logic can compare one or more values associated with the expected data of the pressure sub-system, the flow sub-system, or the temperature sub-system to one or more values associated with the current measured behavior of the pressure sub-system, the flow sub-system, or the temperature sub-system, respectively. The calibration process can further associate the differences in value to failure data from the manufacturing data graphs. For example, the processing logic can compare the current data to historical data from the manufacturing data graphs, which may include failure data associated with one or more issues, faults, failures, root causes, corrective actions, etc. The processing logic can calibrate the trained machine-learning model by map the failure data to the behavior data.

After block 230, machine-learning model can be used to detect fault patterns (e.g., abnormal behavior) of the process chamber sub-system and generate predicative data indicative of the type of fault (e.g., issue, failure, possible root cause of the issue and/or failure) and a corrective action(s) to correct the suspected issue or failure. This will be explained in greater detail in FIG. 7, below.

Figure 3:
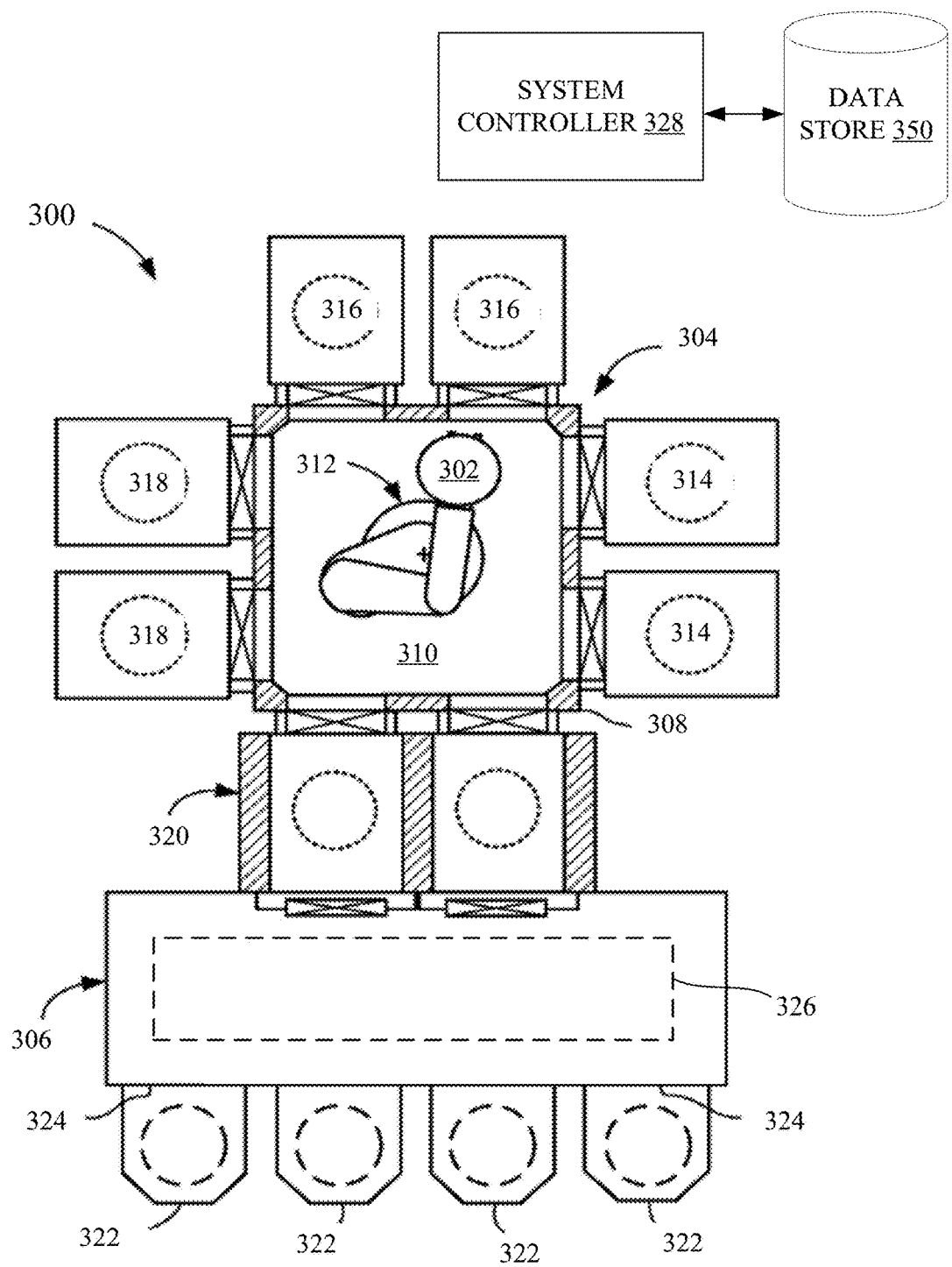
FIG. 3 is a top schematic view of an example manufacturing system, according to certain embodiments.

In some embodiments, a manufacturing system can include more than one process chambers. For example, example manufacturing system 300 of FIG. 3 illustrates multiple process chambers 314, 316, 318. It should be noted that, in some embodiments, data obtained to train the machine-learning model and data collected to be provided as input to the machine-learning model can be associated with the same process chamber of the manufacturing system. In other or similar embodiments, data obtained to train the machine-learning model and data collected to be provided as input to the machine-learning model can be associated with different process chambers of the manufacturing system. In other or similar embodiments, data obtained to train the machine-learning model can be associated with a process chamber of a first manufacturing system and data collected to be provide as input to the machine-learning model can be associated with a process chamber of a second manufacturing system.

FIG. 3 is a top schematic view of an example manufacturing system 300, according to aspects of the present disclosure. Manufacturing system 300 can perform one or more processes on a substrate 302. Substrate 302 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 300 can include a process tool 304 and a factory interface 306 coupled to process tool 304. Process tool 304 can include a housing 308 having a transfer chamber 310 therein. Transfer chamber 310 can include one or more process chambers (also referred to as processing chambers) 314, 316, 318 disposed therearound and coupled thereto. Process chambers 314, 316, 318 can be coupled to transfer chamber 310 through respective ports, such as slit valves or the like. Transfer chamber 310 can also include a transfer chamber robot 312 configured to transfer substrate 302 between process chambers 314, 316, 318, load lock 320, etc. Transfer chamber robot 312 can include one or multiple arms where each arm includes one or more end effectors at the end of each arm. The end effector can be configured to handle particular objects, such as wafers.

Process chambers 314, 316, 318 can be adapted to carry out any number of processes on substrates 302. A same or different substrate process can take place in each processing chamber 314, 316, 318. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 314, 316, 318 can each include one or more sensors configured to capture data for substrate 302 before, after, or during a substrate process. For example, the one or more sensors can be configured to capture spectral data and/or non-spectral data for a portion of substrate 302 during a substrate process. In other or similar embodiments, the one or more sensors can be configured to capture data associated with the environment within process chamber 314, 316, 318 before, after, or during the substrate process. For example, the one or more sensors can be configured to capture data associated with a temperature, a pressure, a gas concentration, etc. of the environment within process chamber 314, 316, 318 during the substrate process.

A load lock 320 can also be coupled to housing 308 and transfer chamber 310. Load lock 320 can be configured to interface with, and be coupled to, transfer chamber 310 on one side and factory interface 306. Load lock 320 can have an environmentally-controlled atmosphere that can be changed from a vacuum environment (wherein substrates can be transferred to and from transfer chamber 310) to an at or near atmospheric-pressure inert-gas environment (wherein substrates can be transferred to and from factory interface 306) in some embodiments. Factory interface 306 can be any suitable enclosure, such as, e.g., an Equipment Front End Module (EFEM). Factory interface 306 can be configured to receive substrates 302 from substrate carriers 322 (e.g., Front Opening Unified Pods (FOUPs)) docked at various load ports 324 of factory interface 306. A factory interface robot 326 (shown dotted) can be configured to transfer substrates 302 between carriers (also referred to as containers) 322 and load lock 320. Carriers 322 can be a substrate storage carrier or a replacement part storage carrier.

Manufacturing system 300 can also be connected to a client device (not shown) that is configured to provide information regarding manufacturing system 300 to a user (e.g., an operator). In some embodiments, the client device can provide information to a user of manufacturing system 300 via one or more graphical user interfaces (GUIs). For example, the client device can provide information regarding a target thickness profile for a film to be deposited on a surface of a substrate 302 during a deposition process performed at a process chamber 314, 316, 318 via a GUI. The client device can also provide information regarding a modification to a process recipe in view of a respective set of deposition settings predicted to correspond to the target profile, in accordance with embodiments described herein.

Manufacturing system 300 can also include a system controller 328. System controller 328 can be and/or include a computing device such as a personal computer, a server computer, a programmable logic controller (PLC), a microcontroller, and so on. System controller 328 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 328 can include a data storage device (e.g., one or more disk drives and/or solid state drives), a main memory, a static memory, a network interface, and/or other components. System controller 328 can execute instructions to perform any one or more of the methodologies and/or embodiments described herein. In some embodiments, system controller 328 can execute instructions to perform one or more operations at manufacturing system 300 in accordance with a process recipe. The instructions can be stored on a computer readable storage medium, which can include the main memory, static memory, secondary storage and/or processing device (during execution of the instructions).

System controller 328 can receive data from sensors included on or within various portions of manufacturing system 300 (e.g., processing chambers 314, 316, 318, transfer chamber 310, load lock 320, etc.). In some embodiments, data received by the system controller 328 can include spectral data and/or non-spectral data for a portion of substrate 302. In other or similar embodiments, data received by the system controller 328 can include data associated with processing substrate 302 at processing chamber 314, 316, 318, as described previously. For purposes of the present description, system controller 328 is described as receiving data from sensors included within process chambers 314, 316, 318. However, system controller 328 can receive data from any portion of manufacturing system 300 and can use data received from the portion in accordance with embodiments described herein. In an illustrative example, system controller 328 can receive data from one or more sensors for process chamber 314, 316, 318 before, after, or during a substrate process at the process chamber 314, 316, 318. Data received from sensors of the various portions of manufacturing system 300 can be stored in a data store 350. Data store 350 can be included as a component within system controller 328 or can be a separate component from system controller 328. In some embodiments, data store 350 can be data store 140 described with respect to FIG. 1.

Figure 4:
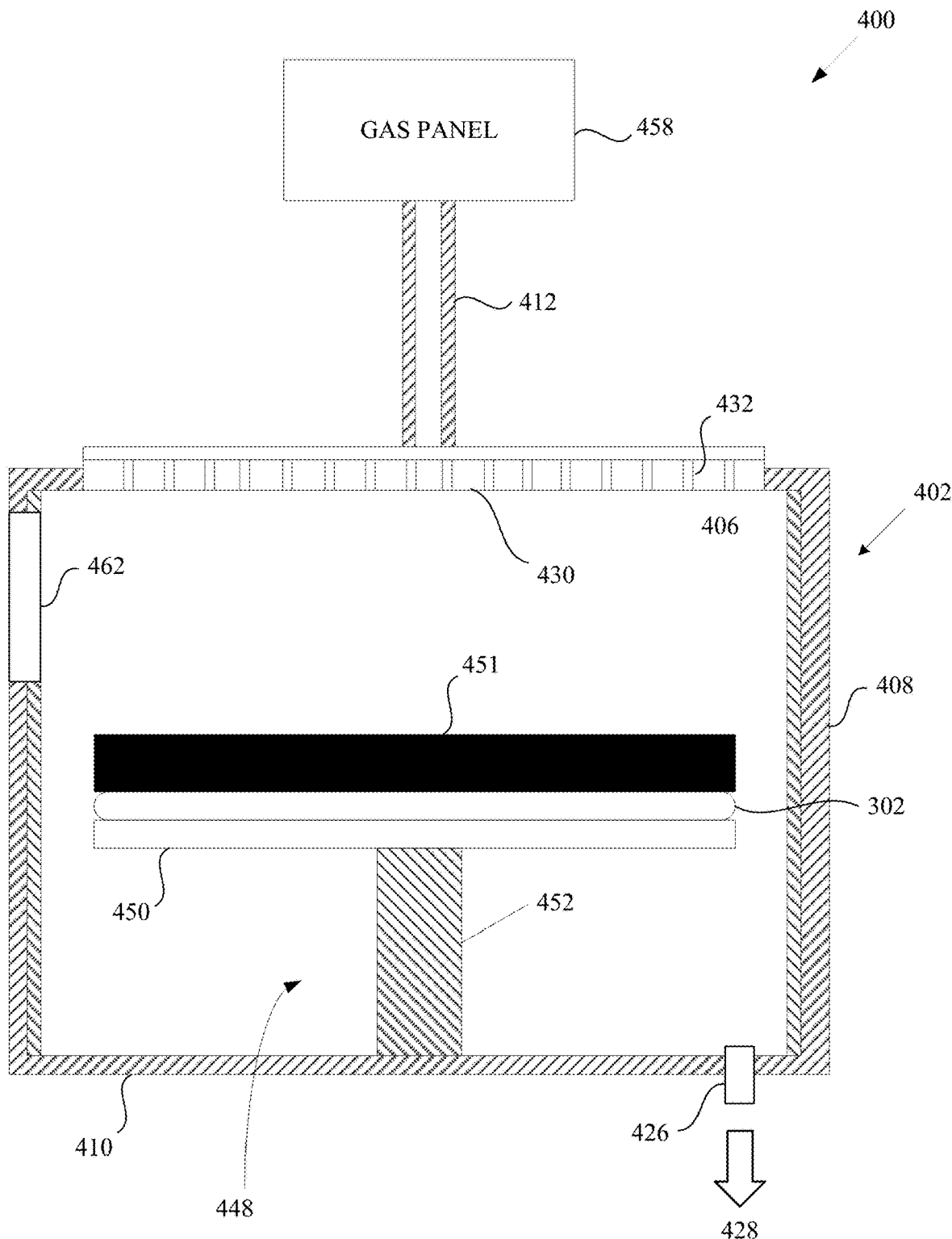
FIG. 4 is a cross-sectional schematic side view of an example process chamber of the example manufacturing system, according to certain embodiments.

FIG. 4 is a cross-sectional schematic side view of a process chamber 400, in accordance with embodiments of the present disclosure. In some embodiments, process chamber 400 can correspond to process chamber 314, 316, 318, described with respect to FIG. 3. Process chamber 400 can be used for processes in which a corrosive plasma environment is provided. For example, the process chamber 400 can be a chamber for a plasma etcher or plasma etch reactor, and so forth. In another example, process chamber can be a chamber for a deposition process, as previously described. In one embodiment, the process chamber 400 includes a chamber body 402 and a showerhead 430 that encloses an interior volume 406. The showerhead 430 can include a showerhead base and a showerhead gas distribution plate. Alternatively, the showerhead 430 can be replaced by a lid and a nozzle in some embodiments, or by multiple pie shaped showerhead compartments and plasma generation units in other embodiments. The chamber body 402 can be fabricated from aluminum, stainless steel or other suitable material such as titanium (Ti). The chamber body 402 generally includes sidewalls 408 and a bottom 410. An exhaust port 426 can be defined in the chamber body 402, and can couple the interior volume 406 to a pump system 428. The pump system 428 can include one or more pumps and throttle valves utilized to evacuate and regulate the pressure of the interior volume 406 of the process chamber 400.

The showerhead 430 can be supported on the sidewall 408 of the chamber body 402. The showerhead 420 (or lid) can be opened to allow access to the interior volume 406 of the process chamber 400, and can provide a seal for the process chamber 400 while closed. A gas panel 458 can be coupled to the process chamber 400 to provide process and/or cleaning gases to the interior volume 406 through the showerhead 430 or lid and nozzle (e.g., through apertures of the showerhead or lid and nozzle). For example. gas panel 458 can provide precursors for materials of a film 451 deposited on a surface of a substrate 302. In some embodiments, a precursor can include a silicon-based precursor or a boron-based precursor. The showerhead 430 can include a gas distribution plate (GDP) and can have multiple gas delivery holes 432 (also referred to as channels) throughout the GDP. A substrate support assembly 448 is disposed in the interior volume 406 of the process chamber 400 below the showerhead 430. The substrate support assembly 448 holds a substrate 302 during processing (e.g., during a deposition process).

In some embodiments, processing chamber 400 can include metrology equipment (not shown) configured to generate in-situ metrology measurements during a process performed at process chamber 400. The metrology equipment can be operatively coupled to the system controller (e.g., system controller 328, as previously described). In some embodiments, the metrology equipment can be configured to generate a metrology measurement value (e.g., a thickness) for film 451 during particular instances of the deposition process. The system controller can generate a thickness profile for film 451 based on the received metrology measurement values from the metrology equipment. In other or similar embodiments, processing chamber 400 does not include metrology equipment. In such embodiments, the system controller can receive one or more metrology measurement values for film 451 after completion of the deposition process at process chamber 400. System controller can determine a deposition rate based on the one or more metrology measurement values and can associate generate the thickness profile for film 451 based on the determined concentration gradient and the determined deposition rate of the deposition process.

Figure 5A:
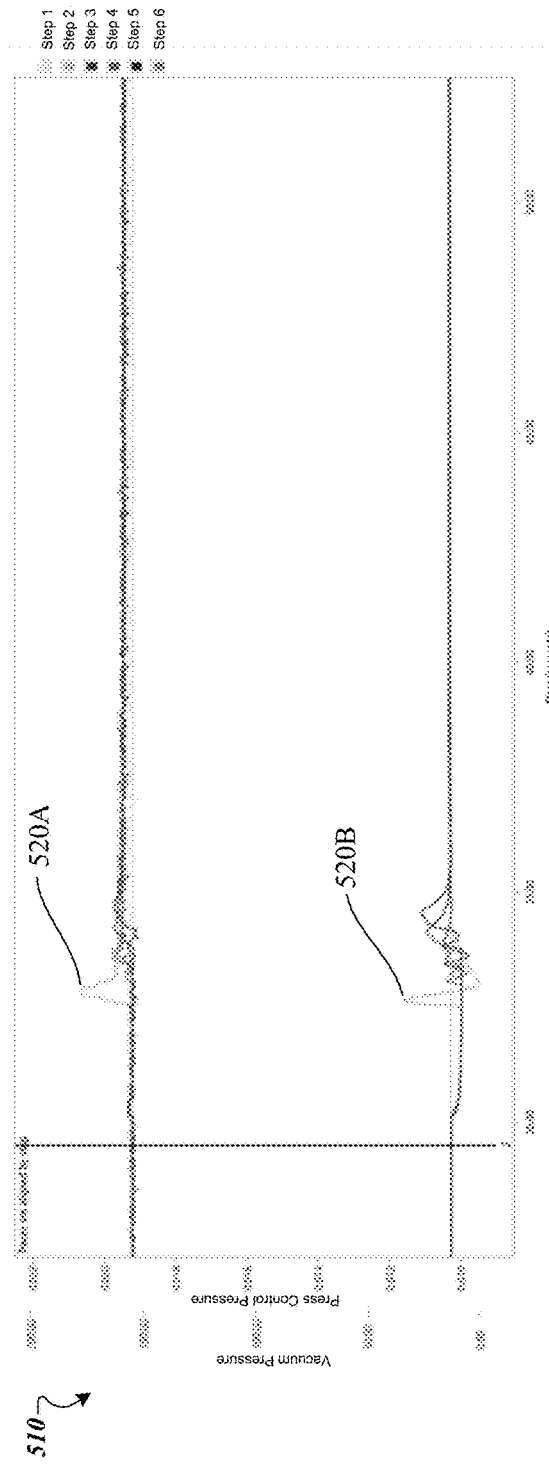
FIGS. 5A-B are example illustrations of manufacturing data graphs, according to aspects of the present disclosure.
Figure 5B:
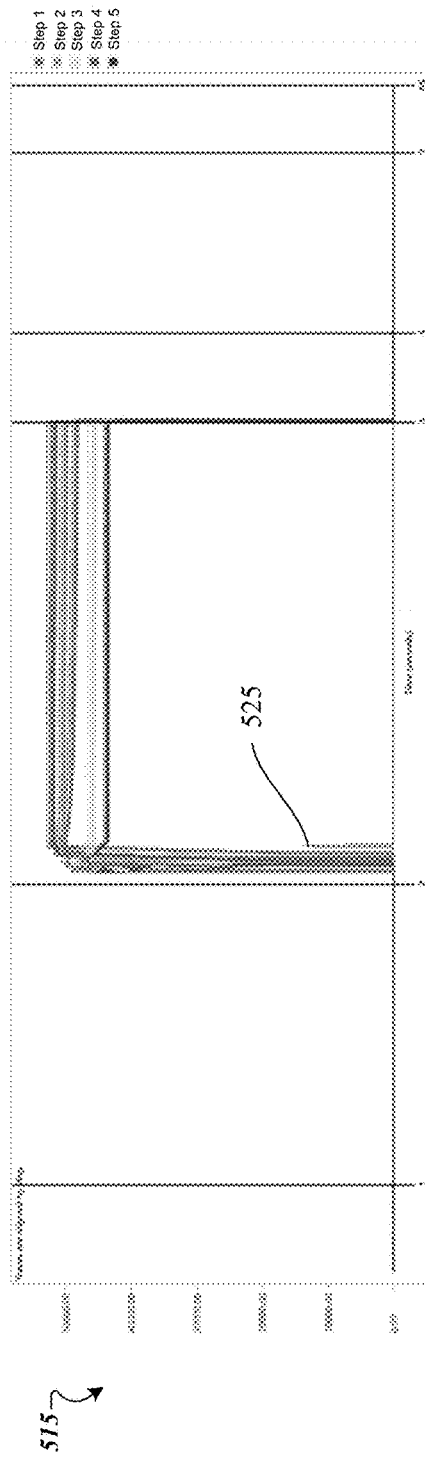

FIGS. 5A-B are example illustrations of manufacturing data graph 510 and manufacturing data graph 515, respectively, according to aspects of the present disclosure. In some embodiments, the manufacturing data graphs are generated by representation server 116 and displayed on user interface 123. Manufacturing data graph 510 shows vacuum pressures over time for multiple steps of a process recipe and press control pressure over time for the multiple steps of the process recipe. In some embodiments, the representation server 116 retrieves data from the data store 140 (e.g., sensor data, trace data, etc.) and generates one or more manufacturing data graphs (e.g., manufacturing data graph 510 and manufacturing data graph 515) based on the retrieved data. In some embodiments, the operator can select a recipe step or data point on the graph to view related metadata. For example, peak 520A and 520B visually indicate an abnormal spike (e.g., not similar to the other process steps shown in the graph 510) in pressure. The abnormal spike can indicate a fault or failure that occurred during the recipe step. The operator can select, for example, peak 520A and the user interface 123 can display metadata related to the select peak 520A. In one example, the related metadata includes metadata such as a process chamber identifier, a process recipe identifier, a subsystem type (e.g., pressure sub-system), an operator name, a date and/or time, etc. In some embodiments, the operator can open a ticket (e.g., a case file) for the selected peak (e.g., peak 520A) using the ticketing tool provided by the GUI 123.

Figures 6A, 6B:
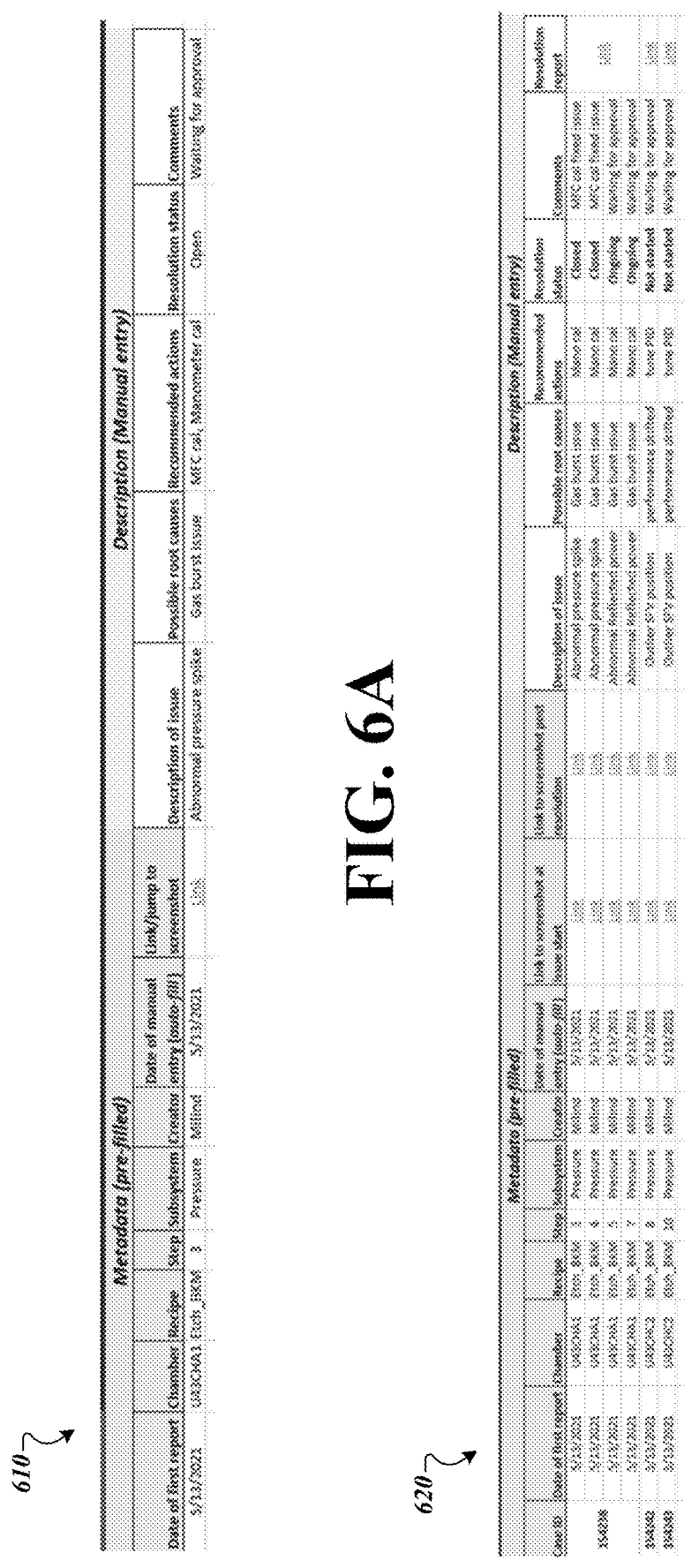

FIGS. 6A-6B schematically illustrate example metadata and failure data maintained by the representation server, according to aspects of the present disclosure. In some embodiments, representation server 116 can maintain failure table 610 and failure table 620. In some embodiments, failure tables 610 and 620 can be stored in data store 140 and can be referenced by predictive system 110 to update or calibrate model 190. This will be explained in detail in FIG. 7.

Failure table 610 illustrates a row of a ticket generated for peak 520A. Failure table 620 illustrates multiple rows of generated tickets. The representation server 116 can automatically generate (e.g., retrieve from data store 140) the metadata associated with the generated ticket. In one example, as illustrated in table 610, the metadata can include a date of the opened ticket, the process chamber identifier, the process recipe identifier, the step number of the process recipe, the subsystem type (e.g., pressure sub-system), an operator name (e.g., Miland), the data of manual entry, an a hyperlink to a screenshot of the manufacturing graph. The row further includes fields to enter a description of the fault (described as abnormal pressure spike in failure table 610), a possible root cause of the issue (described as gas burst issue in failure table 610), a recommended corrective action to correct the issue (described as manufacturing calibration and/or manometer calibration in failure table 610), a resolution status (e.g., open, ongoing, not started, closed, etc.) and comments. Each ticket can be stored in, for example, the data store 140 for future access or reference. For example, an operator may notice a pressure spike in another step, and, via the user interface, filter or sort tickets based on pressure spikes. The operator may then open a similar ticket to determine the possible root cause and recommended corrective action. In some embodiments, the data from each ticket can be used to calibrate or update model 190.

Figure 7:
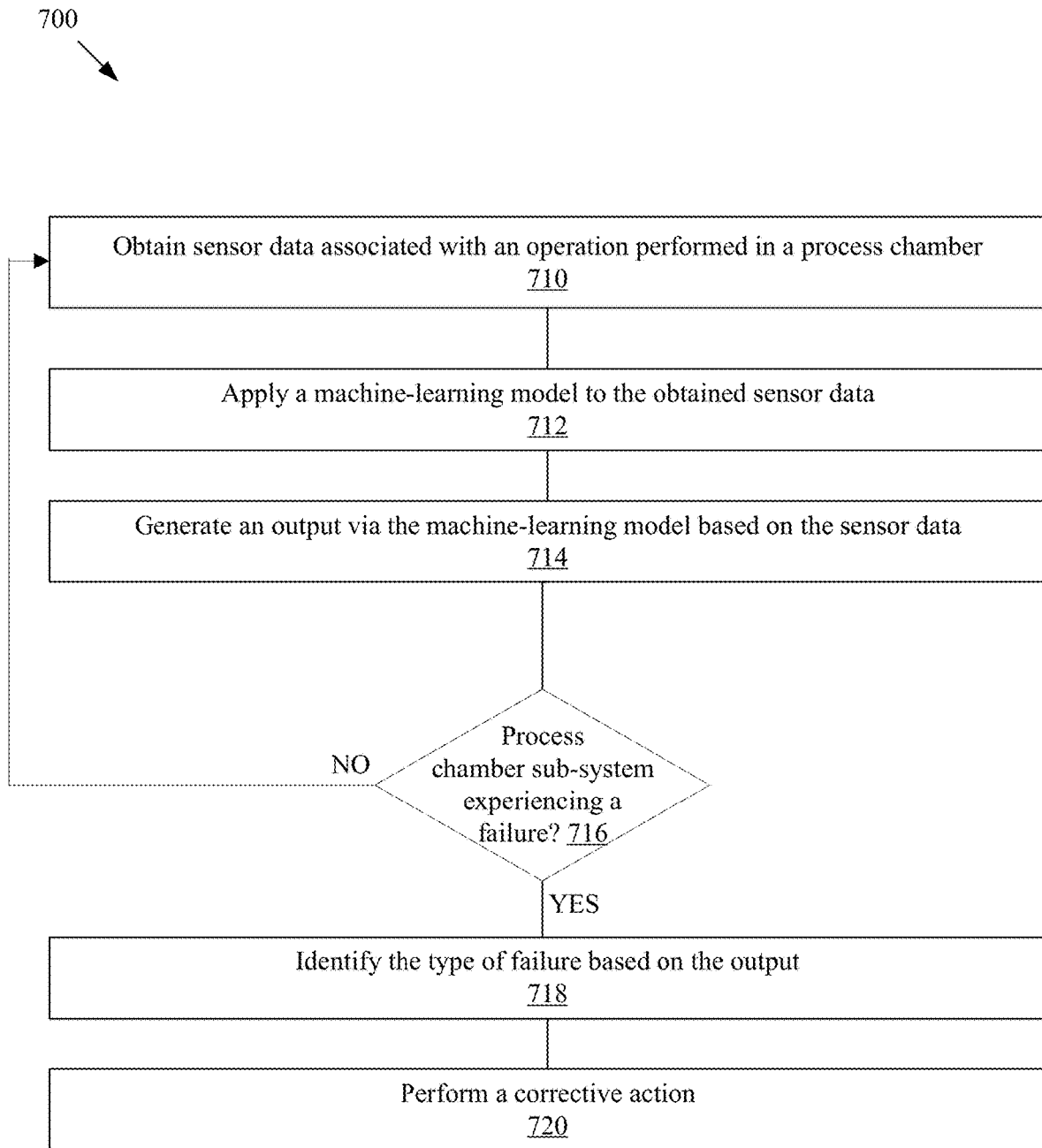
FIG. 7 is a flow diagram of a method for determining a failure type of a process chamber sub-system using a machine-learning model, according to certain embodiments.

FIG. 7 is a flow chart of a method 700 for determining a failure type of a process chamber sub-system using a machine-learning model, according to aspects of the present disclosure. Method 700 is performed by processing logic that can include hardware (circuitry, dedicated logic, etc.), software (such as is run on a general purpose computer system or a dedicated machine), firmware, or some combination thereof. In one implementation, method 700 can be performed by a computer system, such as computer system architecture 100 of FIG. 1. In other or similar implementations, one or more operations of method 700 can be performed by one or more other machines not depicted in the figures. In some aspects, one or more operations of method 600 can be performed by server machine 170, server machine 180, and/or predictive server 112.

At block 710, processing logic obtains sensor data associated with an operation performed in a process chamber. In some embodiments, the operation can include a deposition process performed in a process chamber to deposit one or more layers of film on a surface of a substrate, an etch process performed on the one or more layers of film on the surface of the substrate, etc. The operation can be performed according to a recipe. The sensor data can include a value of one or more of temperature (e.g., heater temperature), spacing, pressure, high frequency radio frequency, voltage of electrostatic chuck, electrical current, material flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124.

At block 712, processing logic applies a machine-learning model (e.g. model 190) to the obtained sensor data and generates an output via the machine-learning model based on the sensor data.

At block 714, processing logic generates an output via the machine-learning model based on the sensor data. In some embodiments, the output can include predicative data of whether the current data is indicative of a failure being experience by the process chamber. In some embodiments, the output can be at least one value indicative of a difference between the expected behavior of the process chamber sub-system and the actual behavior of the process chamber sub-system. In particular, the value(s) can be indicative of a difference between actual values of a set of sensors associated with the sub-system and the expected values of the set of sensors. The failure can include a mechanism failure, high or low pressure, high or low gas flow, high or low temperature, etc.

At block 716, the processing logic determines whether the process chamber sub-system is experiencing a failure. In some embodiments, the processing logic can determine whether the process chamber sub-system is experiencing a failure by comparing the output to a predetermined threshold value. In some embodiments, the processing logic can determine whether the process chamber sub-system is experiencing a failure by determining that the output fails to match expected behavior. Responsive to the processing logic determining that the process chamber sub-system is not experiencing a failure, the processing logic can proceed to block 710. Responsive to the processing logic determining that the process chamber sub-system is experiencing a failure, the processing logic can proceed to block 718.

At block 718, the processing logic can identify the type of failure based on the output. In some embodiments, the processing logic can compare the fault pattern against the manufacturing data graph(s) and/or a library of known fault patterns to determine the type of failure based on a similarity of the fault pattern when compared to a known fault pattern or the manufacturing data graph(s). In some embodiments, the type of fault can be extracted from the manufacturing data graphs using natural language processing and then associated with the corresponding fault pattern. In some embodiments, the type of failure can be displayed (to an operator) on a user interface.

At block 720, the processing logic can perform (or suggest), based on the identified failure, a corrective action. In some embodiments, the corrective action can be extracted from the manufacturing data graphs using natural language processing and then associated with the type of failure. In some embodiments, the corrective action can include generating an alert or an indication, to the client device 120, of the determined problem. In some embodiments, the corrective action can include the processing logic indicating the type of fault or failure, the cause of the fault or failure, and/or a recommend corrective action. In some embodiments, the corrective action can include the processing logic adjusting one or more parameters of a deposition process recipe (e.g., a temperature setting for the process chamber, a pressure setting for the process chamber, a flow rate setting for a precursor for a material included in the film deposited on the substrate surface, etc.) based on a desired property for the film. In some embodiments, the deposition process recipe can be adjusted before, during (e.g., in real time) or after the deposition process.

Figure 8:
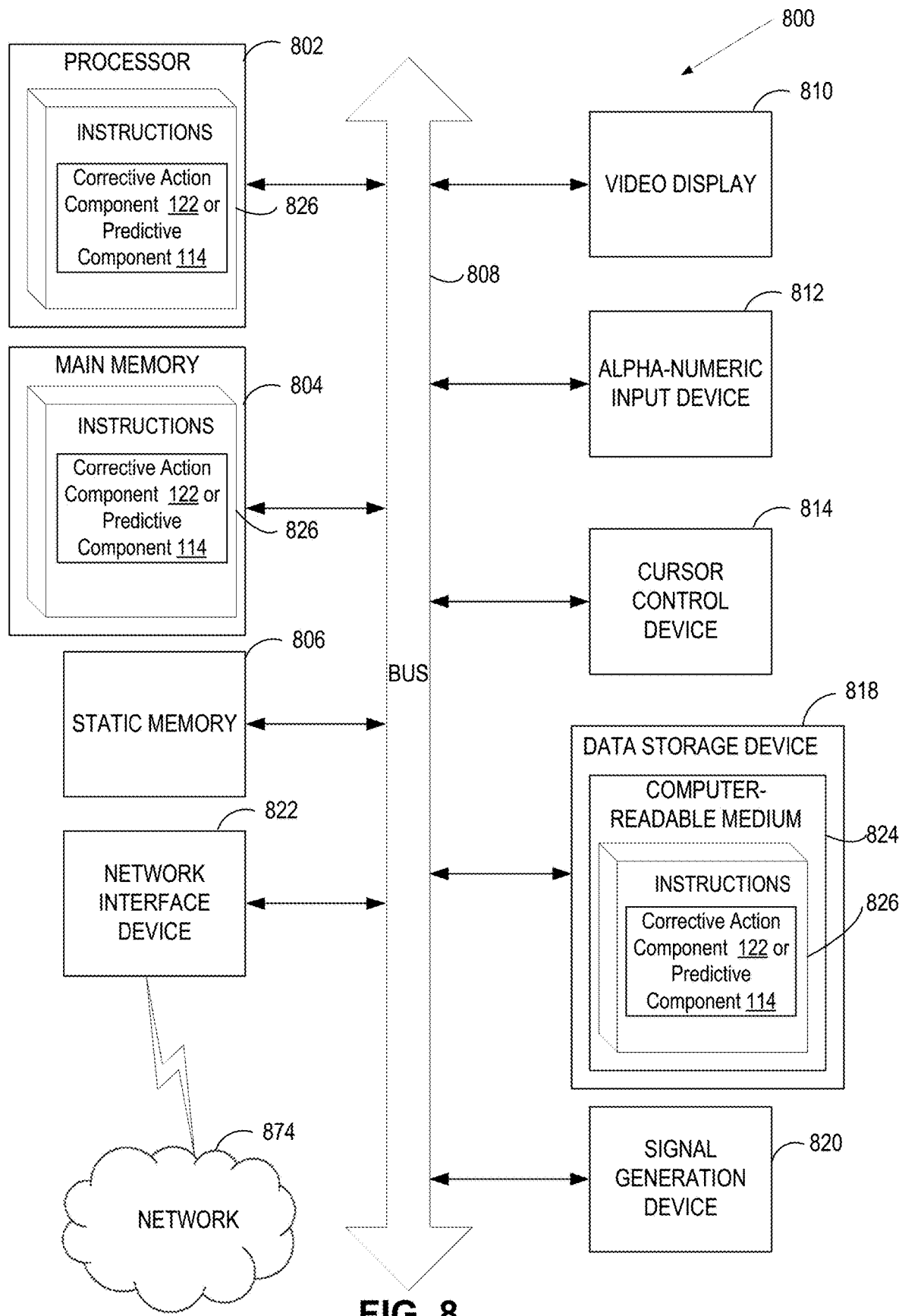
FIG. 8 is a block diagram illustrating a computer system, according to certain embodiments.

FIG. 8 is a block diagram illustrating a computer system 800, according to certain embodiments. In some embodiments, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., Random Access Memory (RAM)), a non-volatile memory 806 (e.g., Read-Only Memory (ROM) or Electrically-Erasable Programmable ROM (EEPROM)), and a data storage device 816, which may communicate with each other via a bus 808.

Processing device 802 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 800 may further include a network interface device 822 (e.g., coupled to network 874). Computer system 800 also may include a video display unit 810 (e.g., an LCD), an alphanumeric input device 812 (e.g., a keyboard), a cursor control device 814 (e.g., a mouse), and a signal generation device 820.

In some implementations, data storage device 816 may include a non-transitory computer-readable storage medium 824 on which may store instructions 826 encoding any one or more of the methods or functions described herein, including instructions encoding components of FIG. 1 (e.g., corrective action component 122, predictive component 114, etc.) and for implementing methods described herein.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory; and
a processing device, operatively coupled to the memory, to perform operations comprising:
obtaining a plurality of sensor values associated with a deposition process performed, according to a recipe, in a process chamber to deposit film on a surface of a substrate;
generating a manufacturing data graph based on the plurality of sensor values;
receiving, via a user interface, a selection of a data point on the manufacturing data graph;
generating a ticket for the data point;
receiving, via the ticket, failure data associated with the data point; and
storing, in a data structure, the ticket to be accessible via the user interface presenting the manufacturing data graph.

2. The system of claim 1, wherein the processing device is to further perform operations comprising:
extracting failure data from a table associated with the manufacturing data graph for training a machine learning model.

3. The system of claim 2, wherein the failure data is extracted using a natural language processing.

4. The system of claim 1, wherein the processing device is to further perform operations comprising:
automatically generating metadata associated with the data point.

5. The system of claim 1, wherein the ticket includes a hyperlink to a screenshot of the manufacturing data graph.

6. The system of claim 1, wherein the processing device is to further perform operations comprising:
providing a field for user input associated with failure data.

7. The system of claim 1, wherein the processing device is to further perform operations comprising:
training a machine-learning model based on data associated with the manufacturing data graph.

8. The system of claim 7, wherein the machine-learning model is trained to generate an output indicative of a failure of a sub-system.

9. The system of claim 8, wherein the machine-learning model is trained to indicate a corrective action based on the failure of the sub-system.

10. A method comprising:
obtaining, by a processor, a plurality of sensor values associated with a deposition process performed, according to a recipe, in a process chamber to deposit film on a surface of a substrate;
generating a manufacturing data graph based on the plurality of sensor values;
receiving, via a user interface, a selection of a data point on the manufacturing data graph;
generating a ticket for the data point receiving, via the ticket, failure data associated with the data point; and
storing, in a data structure, the ticket to be accessible via the user interface presenting the manufacturing data graph.

11. The method of claim 10, further comprising:
extracting failure data from a table associated with the manufacturing data graph for training a machine learning model.

12. The method of claim 11, wherein the failure data is extracted using a natural language processing.

13. The method of claim 11, further comprising:
automatically generating metadata associated with the data point; and
providing a field for user input associated with failure data.

14. The method of claim 10, further comprising:
training a machine-learning model based on data associated with the manufacturing data graph.

15. The method of claim 14, wherein the machine-learning model is trained to generate an output indicative of a failure of a sub-system.

16. The method of claim 15, wherein the machine-learning model is trained to indicate a corrective action based on the failure of the sub-system.

17. A non-transitory computer-readable storage medium comprising instructions that, when executed by a processing device operatively coupled to a memory, performs operations comprising:
obtaining a plurality of sensor values associated with a deposition process performed, according to a recipe, in a process chamber to deposit film on a surface of a substrate;
generating a manufacturing data graph based on the plurality of sensor values;
receiving, via a user interface, a selection of a data point on the manufacturing data graph;
generating a ticket for the data point;
receiving, via the ticket, failure data associated with the data point; and
storing, in a data structure, the ticket be accessible via the user interface presenting the manufacturing data graph.

18. The non-transitory computer-readable storage medium of claim 17, wherein the operations further comprise:
extracting failure data from a table associated with the manufacturing data graph for training a machine learning model.

19. The non-transitory computer-readable storage medium of claim 17, wherein the operations further comprise:
automatically generating metadata associated with the data point.

20. The non-transitory computer-readable storage medium of claim 17, wherein the operations further comprise:
training a machine-learning model based on data associated with the manufacturing data graph.

* * * * *